United States Patent
Wang et al.

(10) Patent No.: US 11,893,506 B1
(45) Date of Patent: Feb. 6, 2024

(54) DECISION TREE TRAINING WITH DIFFERENCE SUBSETS OF TRAINING SAMPLES BASED ON A PLURALITY OF CLASSIFICATIONS

(71) Applicant: Hewlett-Packard Development Company, L.P., Spring, TX (US)

(72) Inventors: Xiangdong Wang, Carlisle, MA (US); Yibo Liu, Boxborough, MA (US); Peter L. Chu, Lexington, MA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 274 days.

(21) Appl. No.: 16/909,644

(22) Filed: Jun. 23, 2020

Related U.S. Application Data

(63) Continuation of application No. 16/896,818, filed on Jun. 9, 2020, now abandoned.

(51) Int. Cl.
| | |
|---|---|
| *G06N 5/00* | (2023.01) |
| *G06N 5/04* | (2023.01) |
| *G06N 20/20* | (2019.01) |
| *G06N 5/01* | (2023.01) |

(52) U.S. Cl.
CPC .............. *G06N 5/04* (2013.01); *G06N 5/01* (2023.01); *G06N 20/20* (2019.01)

(58) Field of Classification Search
CPC .......... G06N 20/00; G06N 20/20; G06N 3/08; G06N 3/0454; G06F 21/554; G06F 7/582
See application file for complete search history.

(56) References Cited

U.S. PATENT DOCUMENTS

| | | | | |
|---|---|---|---|---|
| 5,903,884 | A * | 5/1999 | Lyon .................... | G06K 9/6255 706/20 |
| 2005/0196035 | A1* | 9/2005 | Luo ........................ | G06V 20/59 382/154 |
| 2012/0036094 | A1* | 2/2012 | Takeguchi ............ | G06T 7/0012 706/12 |
| 2016/0019440 | A1* | 1/2016 | Shen ...................... | G06V 10/40 382/159 |
| 2018/0260531 | A1* | 9/2018 | Nori ....................... | G06N 7/005 |
| 2018/0268307 | A1* | 9/2018 | Kobayashi ............. | G06F 16/95 |
| 2018/0285493 | A1* | 10/2018 | Huang .................... | G06F 30/20 |

OTHER PUBLICATIONS

Wikipedia, "Binary Tree", https://en.wikipedia.org/wiki/Binary_Tree, May 19, 2020, 7 pages.
Binary Tree and its Types—Data Structure Tutorial—Studytonight, "Introduction to Binary Trees", https://www.studytonight.com/data-structures/introduction-to-binary-trees, Jan. 1, 2020, 3 pages.

* cited by examiner

*Primary Examiner* — Pakee Fang
(74) *Attorney, Agent, or Firm* — Quarles & Brady LLP

(57) ABSTRACT

A method may include obtaining a plurality of training samples with a plurality of classifications that include a first classification and a second classification, training an initial tree with an initial set of training samples selected from the plurality of training samples using an initial set of feature values extracted from the set of training samples, and, in response to determining that the initial tree incorrectly classified the initial set of training samples at an output node of the initial tree, training a subsequent tree using a subsequent set of feature values extracted from a subsequent set of training samples.

20 Claims, 7 Drawing Sheets

DECISION TREE TRAINING WITH DIFFERENCE SUBSETS OF TRAINING SAMPLES BASED ON A PLURALITY OF CLASSIFICATIONS

CROSS-REFERENCE TO RELATED APPLICATION

The present application is a continuation application of and, thereby, claims benefit under 35 U.S.C. § 120 to U.S. application Ser. No. 16/896,818, entitled, "DECISION TREE TRAINING," filed on Jun. 9, 2020, having the same inventors, and incorporated herein by reference.

BACKGROUND

Decision trees may be used to classify samples of images. For example, a decision tree may be used to classify content in an image and/or identify parts of an image, such as for face or body detection. The training time and computational load required to train a decision tree is a function of the number of features being tested and the number of possible classifications. A challenge is to reduce the training time and computational load for training and operating decision trees.

SUMMARY

In general, in one aspect, one or more embodiments relate to a method including obtaining a plurality of training samples with a plurality of classifications that include a first classification and a second classification, training an initial tree with an initial set of training samples selected from the plurality of training samples using an initial set of feature values extracted from the set of training samples, and, in response to determining that the initial tree incorrectly classified the initial set of training samples at an output node of the initial tree, training a subsequent tree using a subsequent set of feature values extracted from a subsequent set of training samples, the subsequent tree comprising a root node at the output node of the initial tree, the subsequent set of training samples in the plurality of training samples.

In general, in one aspect, one or more embodiments relate to a system including a processor and a memory. The memory includes an application that executes on the processor, uses the memory, and is configured for classifying a sample to generate a sample classification with a machine learning model, the machine learning model comprising a decision tree that comprises an initial tree and a subsequent tree. The machine learning model is trained by obtaining a plurality of training samples with a plurality of classifications that include a first classification and a second classification, training an initial tree with an initial set of training samples selected from the plurality of training samples using an initial set of feature values extracted from the set of training samples, and, in response to determining that the initial tree incorrectly classified the initial set of training samples at an output node of the initial tree, training a subsequent tree using a subsequent set of feature values extracted from a subsequent set of training samples, the subsequent tree comprising a root node at the output node of the initial tree, the subsequent set of training samples in the plurality of training samples.

In general, in one aspect, one or more embodiments relate to a set of one or more non-transitory computer readable mediums comprising computer readable program code for obtaining a plurality of training samples with a plurality of classifications that include a first classification and a second classification, training an initial tree with an initial set of training samples selected from the plurality of training samples using an initial set of feature values extracted from the set of training samples, and, in response to determining that the initial tree incorrectly classified the initial set of training samples at an output node of the initial tree, training a subsequent tree using a subsequent set of feature values extracted from a subsequent set of training samples, the subsequent tree comprising a root node at the output node of the initial tree, the subsequent set of training samples in the plurality of training samples.

Other aspects of the invention will be apparent from the following description and the appended claims.

DETAILED DESCRIPTION

Figure 1A:
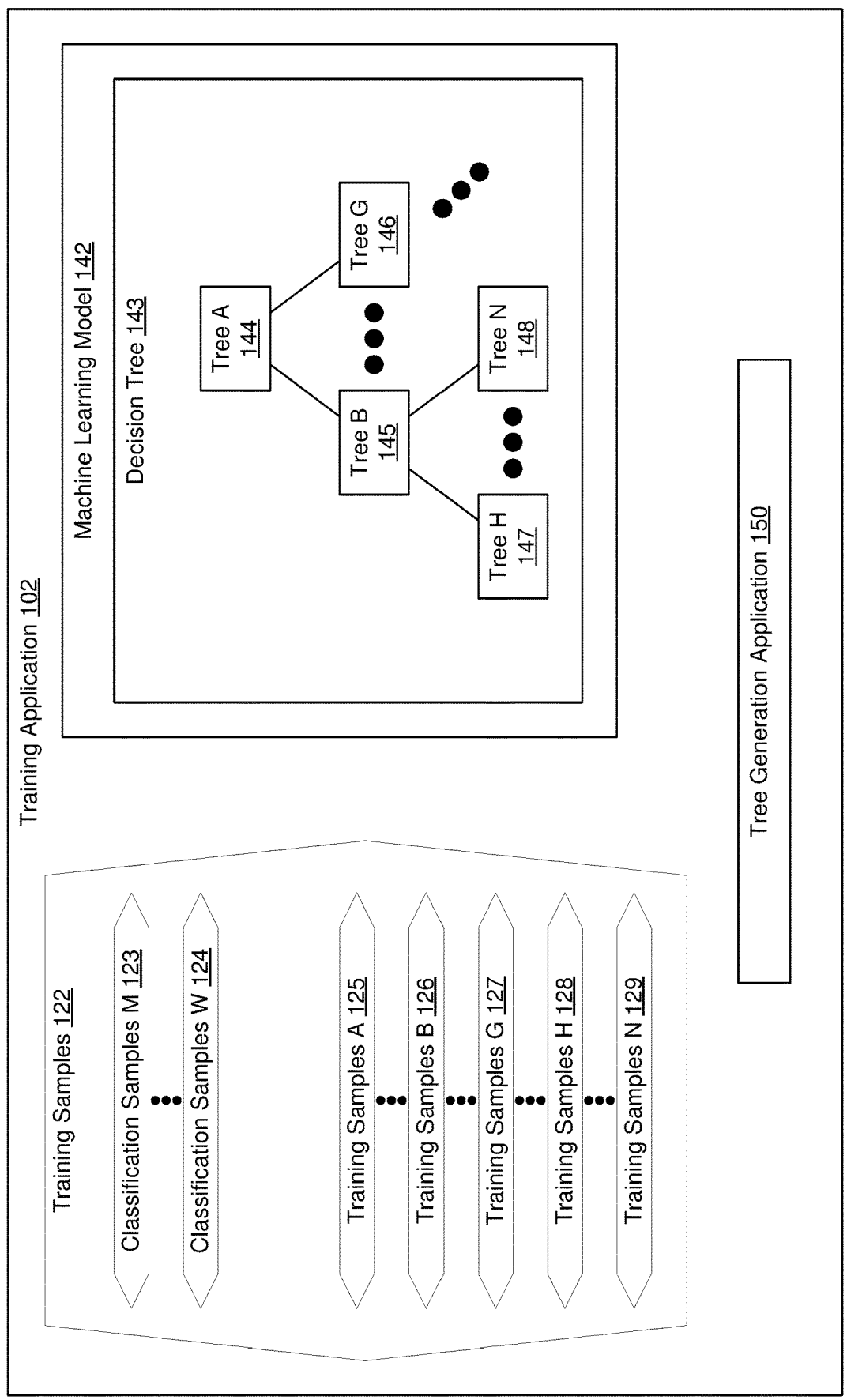
FIG. 1A and FIG. 1B show diagrams of a system in accordance with disclosed embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, one or more embodiments are directed to an iterative, targeted approach to training a decision tree. Specifically, instead of training a decision tree on every possible output of a set of features, smaller trees are trained on a subset of features. For example, an initial tree is trained on a first subset of features. Then if the initial tree does not accurately classify the data samples, additional or subsequent trees may be trained at the leaf node. Further, the subsequent tree is trained using a subsequent set of features. Thus, the additional training with additional features is targeted to an inaccurate portion of the decision tree using extra nodes to improve classification accuracy without burdening the processor with the remaining portion of the decision tree.

Figure 1B:
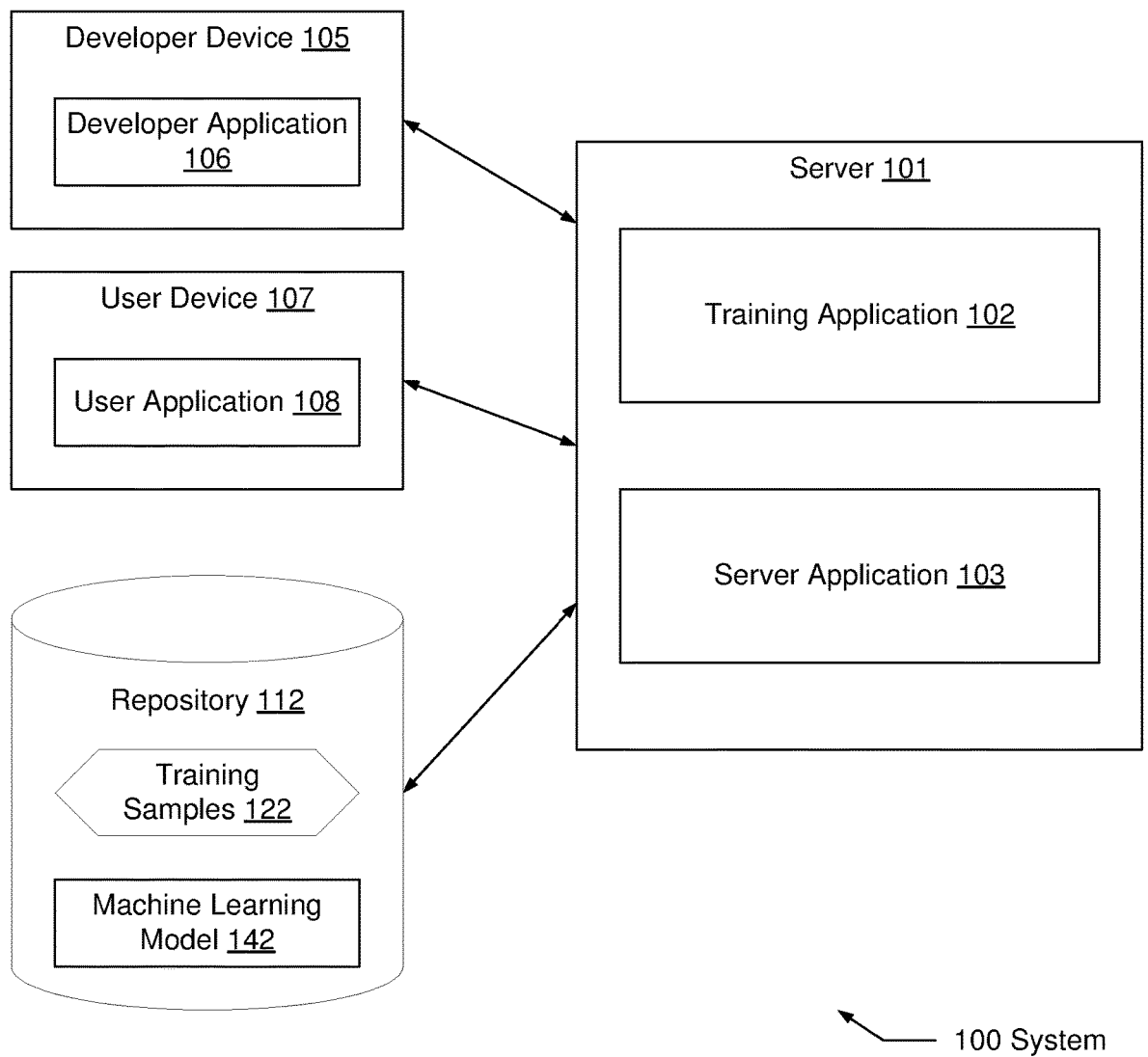

FIG. 1A and FIG. 1B show a diagram of embodiments that are in accordance with the disclosure. FIG. 1A shows a training application that trains decision trees. FIG. 1B shows the system (100), which trains and operates machine learning models with decision trees. The embodiments of FIG. 1A and FIG. 1B may be combined and may include or be included within the features and embodiments described in the other figures of the application. The features and elements of FIG. 1A and FIG. 1B are, individually and as a combination, improvements to the technology of machine learning systems. The various elements, systems, and components shown in FIG. 1A and FIG. 1B may be omitted, repeated, combined, and/or altered as shown from FIG. 1A and FIG. 1B. Accordingly, the scope of the present disclosure should not be considered limited to the specific arrangements shown in FIG. 1A and FIG. 1B.

Turning to FIG. 1A, the training application (102) of the system (100) (shown in FIG. 1B) trains the machine learning model (142) with the training samples (122) and with the tree generation application (150). The machine learning model (142) includes the decision tree (143).

The decision tree (143) may include multiple trees, including the tree A (144), the tree B (145) through the tree G (146), and the tree H (147) through the tree N (148). The trees (144, 145, 146, 147, 148) of the decision tree (143) are interconnected to form the decision tree (143). The interconnection may be that the leaf node of a tree is a root node of another tree. The decision tree (143) and the trees A (144) through N (148) may be m-ary trees with each node of the tree having no more than m children. For example, the decision tree (143) may be a binary decision tree with two children per node, a ternary decision tree with three children per node, etc.

Figure 3A:
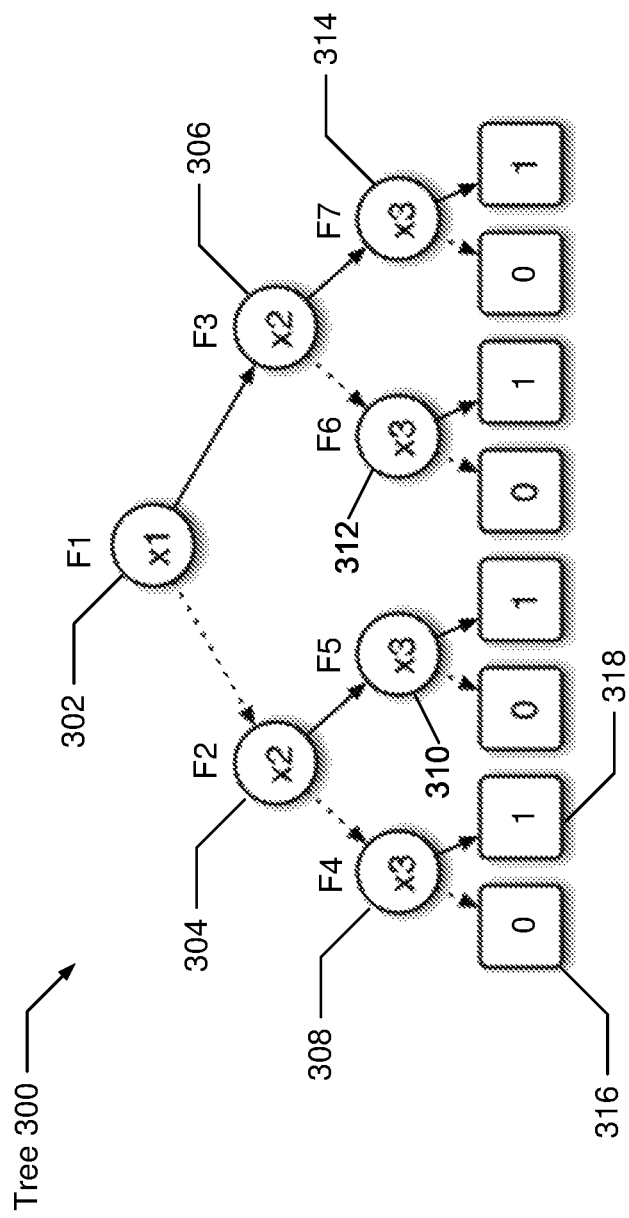
FIGS. 3A, 3B and 3C show examples in accordance with disclosed embodiments.

Each of the trees (144, 145, 146, 147, 148) of the decision tree (143) test a set of features for which feature values may be extracted from a sample. The output of each test being correlated to one of the possible classifications of the sample. For example, the tree A (144) may test for 7 features for which there are 2 classifications in 3 layers. The tree A (144) has $2^3$ or 8 possible outputs (an example of which is shown in FIG. 3A). Each output is from a leaf node of a tree that corresponds to a particular classification. Thus, in the example, tree A (144) may have 8 outputs from 4 leaf nodes.

In an initial training step, the tree A (144) is trained using the training samples A (125). For each possible output of the tree A (144), if the tree A (144) did not properly classify the portion of the training samples A (125) leading to that output, then another tree (e.g., the tree B (145)) is trained using a different set of features from which a different set of feature values are extracted. Whether the samples are properly classified may be determined using a classification accuracy threshold applied to each output of a node. As an example, the classification accuracy threshold may be satisfied when a threshold percentage (e.g., 90%) of the samples tested at a leaf node of the tree A (144) be correctly classified. When the classification accuracy threshold is not satisfied, subsequent training and additional trees may be performed and generated for the outputs of the node that did not satisfy the classification accuracy threshold.

In a subsequent training step (i.e., after training the tree A (144)), the trees B (145) through G (146) are trained with the training samples B (126) through G (127), respectively. The trees B (145) through G (146) correspond to outputs from the tree A (144) that did not properly classify the training samples A (125). Thus, trees B (145) through G (146) correspond to additional decision analysis based on additional features, where the additional analysis starts at outputs of tree A (144).

In a further subsequent step (e.g., after training the tree B (145)), the trees H (147) through N (148) are trained with the training samples H (128) through N (129), respectively. The trees H (147) through N (148) correspond to outputs from the tree B (145) that did not properly classify the training samples B (126).

Training the trees B (145) through G (146) after determining which outputs of the tree A (144) did not correctly classify the training samples A (125), in addition to training the trees B (145) through G (146) when the outputs of the tree A (144) incorrectly classified training samples, reduces the amount of training for the decision tree (143) and the machine learning model (142). For example, with 6 layers of binary features, there would be $2^6$ or 64 possible outputs testing up to 63 features. However, by splitting the 6 layers of features into two groups of 3 layers, then in a best case scenario, the first three layers (having 7 features and 8 outputs) would properly classify the training samples so that the remaining three layers (for the trees B (145) through G (146)) may not be extracted, tested, or trained.

Multiple layers of trees may be trained until one or more thresholds are satisfied. For example, a system accuracy threshold (e.g., 99.9%) may be satisfied when the percentage of correct classifications for the training samples (122) is greater than the system accuracy threshold. As another example, a feature depth threshold (e.g., 40 total features) may be satisfied when the total number of distinct features tested is greater than or equal to the feature depth threshold. Other mathematical permutations of these and other thresholds may be used to control the amount or accuracy of training.

The tree generation application (150) generates the trees (144, 145, 146, 147, 148) in the decision tree (143) of the machine learning model (142). After training a tree (e.g., the tree A (144)), the tree generation application (150) determines which outputs of the tree have incorrectly classified the training samples used for the tree being trained. For outputs that have not correctly classified the training samples used for the tree being trained, a subsequent tree is trained. For example, after training the tree A (144) with the training samples A (125), the tree B (145) is created and the training samples B (126) are selected to be trained for the output of the node of the tree A (144) that did not correctly classify the some of the training samples A (125).

The training application (102) may have a pool of features to use for the machine learning model (142). The training application (102) may train multiple machine learning models using different orders of features within the hierarchy of trees that make up the decision tree (143). For example, the training application (102) may have a pool of 200 or more different features for which feature values may be extracted. The decision tree (143) of the machine learning model (142) may use the first 7 features for the tree A (144), the next 7 features for the tree B (145), and the next 7 features for the tree H (147), using a total of 21 of the 200 or more possible features. A subsequent machine learning model may be trained that uses different ones of the 200 features, uses a different order of the features, uses different number of features for the different layers of the trees, etc. Each tree in a layer of trees (e.g., the layer of trees B (145) through G (146)) may use the same or different features and order of features.

In one embodiment, the features are Haar-like features. The Haar-like features may categorize subsections of an image by calculating the difference between the sum of pixel intensities of adjacent rectangular regions of an image.

Haar-like features may be used for face detection to determine if an image includes a face of a person.

The training samples (122) are the training data used to train the machine learning model (142) by the training application (102). The training samples (122) may be images. The training samples (122) may also include multiple groupings. The groupings may be based on a classification of a training sample and may be based on which of the trees A (144) through N (148) that the training sample is used to train.

Two or more classifications may be used to distinguish different groups of samples within the training samples (122). The classifications of the training samples may be a binary classification with two classifications (e.g., true and false). For example, classifications for face detection may include a first classification for samples that include an image of a face of a person and a second classification for samples that do not include an image of a face.

The classifications may also include more than two classifications. For example, classifications for office equipment detection may include a first classification for samples that include an image of a chair, a second classification for samples that include an image of a table, a third classification for samples that include an image of a monitor, etc.

The classification samples M (123) through W (124) of the training samples (122) form one set of groupings of the training samples (122). The classification samples M (123) is a group of the training samples (122) that corresponds to one classification for the training samples (122). The classification samples W (124) is a group of the training samples (122) that corresponds to another classification for the training samples (122). The classification samples M (123) through W (124) are grouped by the classification that corresponds to an individual training sample of the training samples (122). Each group of the classification samples M (123) through W (124) may be disjoint in that a training sample may be part of only one group of the classification samples M (123) through W (124). As an example for binary classification, the classification samples M (123) may be samples with images that include a face of a person and the classification samples W (124) may be samples with images that do not include a face. A training sample with a face may be part of the classification samples M (123) and not be part of the classification samples W (124).

The training samples A (125) through N (129) (including the training samples B (126), G (127), and H (128)) are another grouping of the training samples (122). The training samples A (125) through N (129) are the groups of training samples used to train the corresponding trees A (144) through N (148). The training samples A (125) are used to train the tree A (144), the training samples B (126) are used to train the tree B (145), etc. The training samples A (125) through N (129) may intersect so that one training sample of the training samples (122) may be part of multiple groups of the training samples A (125) through N (129). As an example, a training sample that includes an image of a face may be part of the classification samples M (123) (the group of samples classified as including a face), the training samples A (125) (used to train the tree A (144)), the training samples B (126) (used to train the tree B (145)), and the training samples H (128) (used to train the tree H (147)).

The training samples A (125) are used to train the tree A (144). The training samples A (125) may include all of the classification samples for a first class (e.g., classification samples M (123)) and a portion of the classification samples for a second class (e.g., the classification samples W (124)). For example, with a binary classification for face detection, the first class may be that a sample includes a face of a person within an image and the second class may be that a sample does not include a face within an image.

The training samples B (126) are used to train the tree B (145). The training samples B (126) may include the training samples from the training samples A (125) that lead to a specific output of the tree A (144). For a given output of the tree A (144), only a portion of the training samples A (125) will lead to that output. That portion of the training samples A (125) form a first part of the training samples B (126). In addition to the portion of samples from the training samples A (125), additional samples from the training samples (122) are included in the training samples B (126). Continuing the example for binary classification of face detection, since the classification samples A (125) included each of the first class of samples, the additional samples for the training samples B (126) may include samples from the second class. For example, the classification samples A (125) included each positive sample (i.e., samples that include a face of a person) and a portion of the negative samples (i.e., samples that do not include a face). The classification samples B (126) would include a portion of the positive samples (which were also included in the classification samples A (125)) and would include two types of negative samples, the first being a portion of negative samples from the classification samples A (125) and the second being additional negative samples from the training samples (122) but were not part of the classification samples A (125).

Turning to FIG. 1B, a system (100) is shown that trains and operates machine learning models with decision trees. The system (100) includes the server (101), the repository (112), the developer device (105), and the user device (107). The server (101) may include the training application (102) and the server application (103).

The training application (102) is a program on the server (101). The training application (102) trains the machine learning models of the system (101), as further described in FIG. 1A. The training application (102) may be operated or controlled by the developer device (105) with the developer application (106).

The server application (103) is a program on the server (101). The server application (103) includes multiple programs and machine learning models used by the system (101) to interact with the user device (107), as further described in FIG. 1A. In one embodiment, the server application (103) may use the machine learning model (142) of FIG. 1A that is trained by the training application (102) to classify samples from the user device (107). In a further embodiment, the server application (103) may distribute the machine learning model (142) to the user device (107) so that the user device (107) may use the machine learning model (142) to classify samples.

Figure 4A:
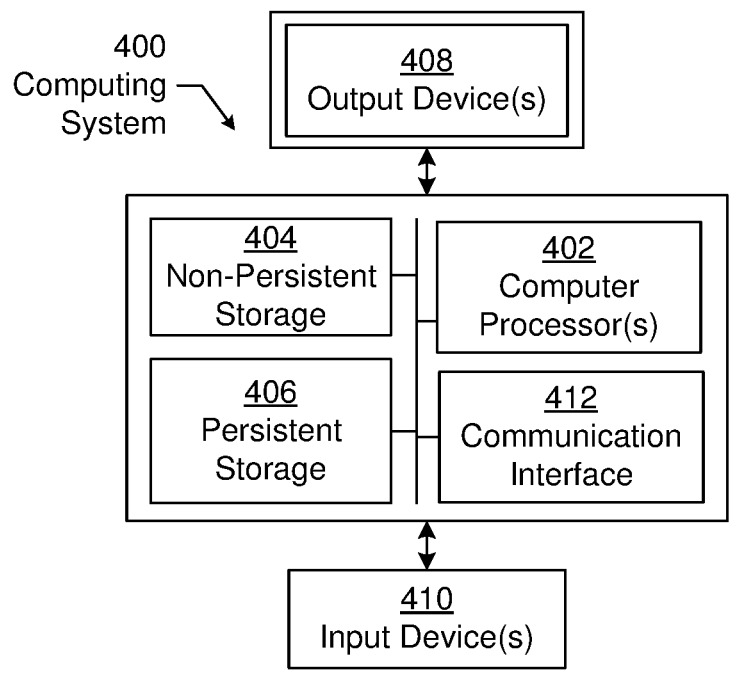
FIG. 4A and FIG. 4B show a computing system in accordance with disclosed embodiments.
Figure 4B:
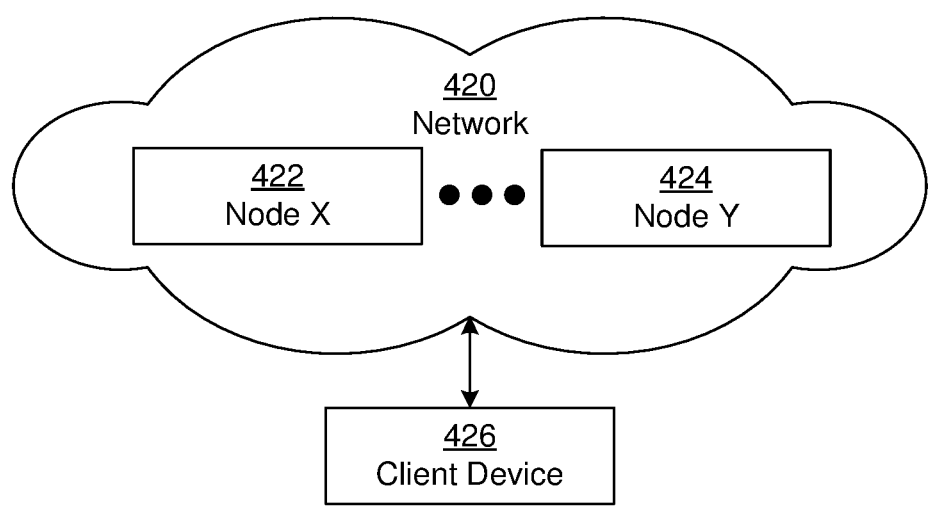

The server (101) is an embodiment of the computing system (400) and the nodes (422) and (424) of FIG. 4A and FIG. 4B. The server (101) may be one of a set of virtual machines hosted by a cloud services provider to deploy the training application (102) and the server application (103) for a service provider.

The repository (112) is a computing system that may include multiple computing devices in accordance with the computing system (400) and the nodes (422) and (424) described below in FIG. 4A and FIG. 4B. The repository (112) may be hosted by a cloud services provider for the service provider. The cloud services provider may provide hosting, virtualization, and data storage services as well as other cloud services and the service provider may operate and control the data, programs, and applications that store and retrieve data from the repository. The data in the repository (112) may include the training samples (122) and the machine learning model (142), which are further described in FIG. 1A.

The developer device (105) is an embodiment of the computing system (400) and the client device (426) of FIG. 4A and FIG. 4B. The developer device (105) includes the developer application (106) for accessing the training application (102). The developer application (106) may include a graphical user interface and an integrated development environment (IDE) to interact with the training application (102) to control training of the machine learning models of the system (100).

The developer application (106) may be a web browser that accesses and controls the training application (102) and the server application (103) using web pages hosted by the server (101). The developer application (106) and the user application (108) may additionally be web services that communicate with the training application (102) and the server application (103) using representational state transfer application programming interfaces (RESTful APIs). Although FIG. 1B shows a client server architecture, one or more parts of the training application (102) and the server application (103) may be local applications on the developer device (105) and the user device (107) without departing from the scope of the disclosure.

The user device (107) is an embodiment of the computing system (400) and the client device (426) of FIG. 4A and FIG. 4B. The user device (107) includes the user application (108), which may use the machine learning model (142), which was trained by the training application (102) and distributed by the server application (103). As an example, the user device (107) may be a video conferencing endpoint embodied as a personal computer with web cam, a stand-alone video conferencing system, a smartphone, etc. The user device may use the machine learning model (142) to detect objects in images (i.e., samples) captured with a camera of the user device (107).

Figure 2:
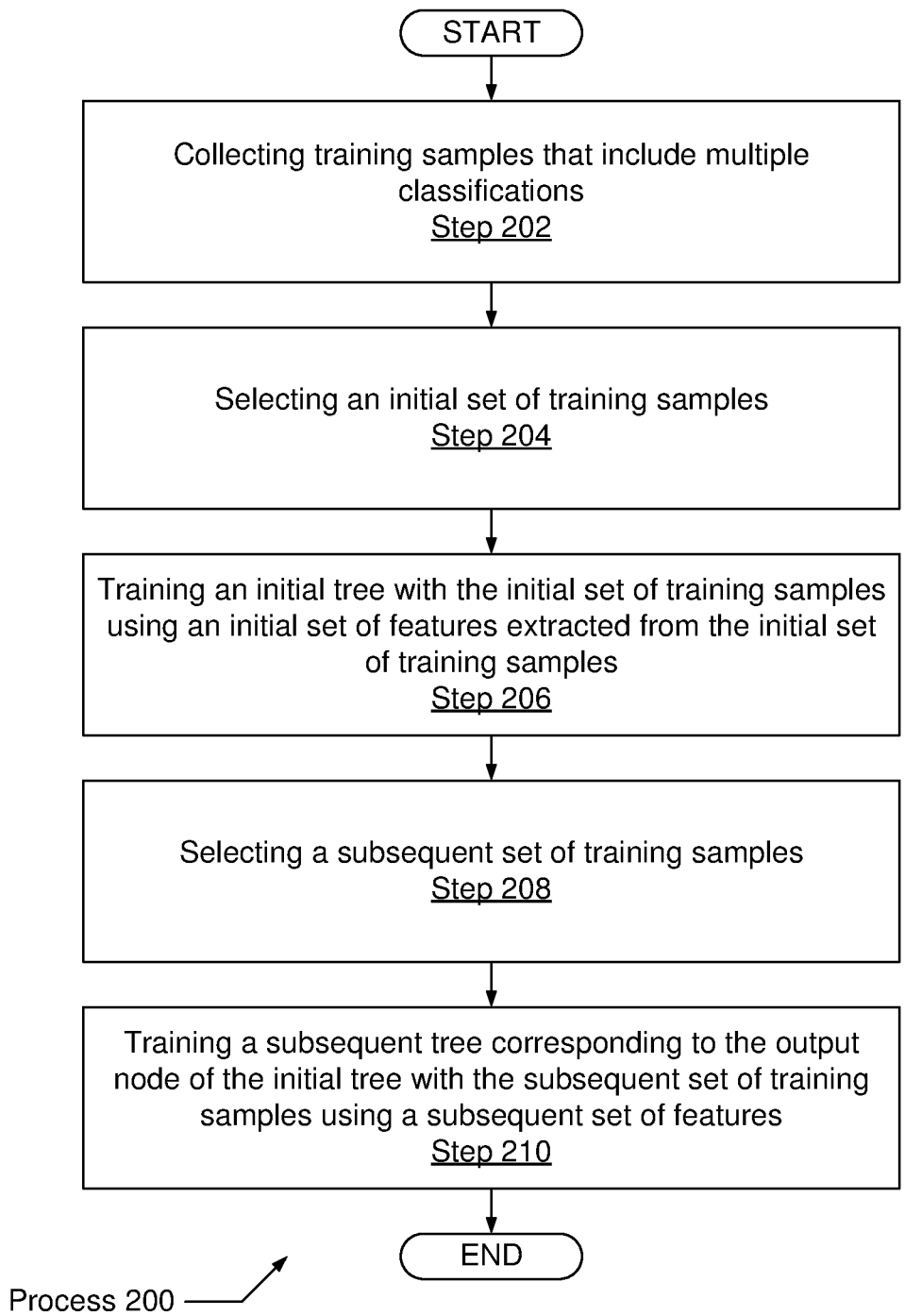
FIG. 2 shows a flowchart in accordance with disclosed embodiments.

FIG. 2 shows a flowchart of the processes (200) in accordance with the disclosure. The process (200) of FIG. 2 trains the decision trees of machine learning models used by computing systems. The embodiment of FIG. 2 may be combined and may include or be included within the features and embodiments described in the other figures of the application. The features of FIG. 2 are, individually and as an ordered combination, improvements to the technology of computing systems and machine learning systems. While the various steps in the flowcharts are presented and described sequentially, one of ordinary skill will appreciate that at least some of the steps may be executed in different orders, may be combined or omitted, and at least some of the steps may be executed in parallel. Furthermore, the steps may be performed actively or passively. For example, some steps may be performed using polling or be interrupt driven. By way of an example, determination steps may not have a processor process an instruction unless an interrupt is received to signify that condition exists. As another example, determinations may be performed by performing a test, such as checking a data value to test whether the value is consistent with the tested condition.

Turning to FIG. 2, the process (200) generates and trains trees for the decision trees of a machine learning models. The machine learning models may classify samples, which may be images.

In Step 202, training samples are collected that include multiple classifications. The classifications may include two or more classifications. As an example, a first classification may be for samples that include a face of a person and a second classification may be for samples that do not include a face. As a further example, the classifications may be for types of office equipment, including a first classification for chairs, a second classification for tables, a third classification for monitors, etc.

The training samples may be stored in a repository. The training samples may be in different formats (the Joint Photographic Experts Group (JPEG) format, the portable network graphics (PNG) format, the tagged image file format (TIFF or TIF), etc.) and converted to a single standardized format when stored in the repository. For example, when the samples are images, the different images may use different image formats, sizes, resolutions, color depths, gamuts, etc., the samples may be converted to a single standardized format, size, resolution, color depth, etc., and stored to the repository.

In Step 204, an initial set of training samples are selected. The initial set of training samples may include a first portion of the training samples that correspond to one of the classifications of the training samples and a second portion of the training samples that correspond to a different classification of the training samples. As an example, the first portion of the initial set of training samples may include each of the training samples that include a face of a person in the sample. The second portion of the initial set of training samples may include a randomly selected subset of the training samples that do not include a face. The first portion of the initial set of training samples may be larger than the second portion. The first portion and the second portion may be disjoint so that a training sample in the first portion does not appear in the second portion.

In Step 206, an initial tree is trained with the initial set of training samples. The initial tree is trained by selecting features, extracting feature values, and testing training samples.

The features may be selected from a pool of features. The pool of features identifies the features that may be used to classify samples. Different features have different likelihoods of correctly classifying a sample and the pool of features may be ordered based on the likelihood that a feature may correctly classify a sample. The set of features with the highest likelihood of classifying a sample may be selected to train the initial tree.

A feature value for each of the selected features is extracted from each of the training samples. The feature identifies a set of rules or transformation to convert the sample into an output value. For example, with Haar-like features that categorize subsections of an image, the difference between the sum of pixel intensities of adjacent rectangular regions of an image sample may be compared to a difference threshold. If the difference threshold is satisfied (e.g., greater than the difference threshold), then the feature is present in the sample. The presence or lack of the feature in multiple samples is correlated to the classification. As an example, the presence of certain features may indicate that a face is detected (i.e., a first classification) and the lack of other features may also indicate that a face is present.

The training samples are tested against the features by comparing the extracted the feature values to the correlations of the classifications. As an example, with 3 layers, a first feature is extracted and a determination is made, based on the correlation to the classification, to identify the classification of the sample at the root node (or first layer node) of the initial tree. Then at second layer nodes, second layer features may be extracted and compared to the correlation to identify the classification of the sample and then similarly for the third layer features at third layer nodes, which may be the output layer of an initial tree with 3 layers. FIG. 3A describes one example for training an initial tree. In one embodiment, the feature values for initial set of training sample are extracted, which reduces the computational load as compared to extracting the feature value from the entire set of training samples. Additionally, for the initial tree, feature values for the features of the subsequent trees may not be extracted to further reduce computational load.

At each of the outputs of the output nodes in the output layer of the initial tree, it is determined if the training samples that reach the output have been correctly classified. For a given sample, the feature values from the sample will lead to one of the outputs of an output node that identifies the classification of the sample. If all of the training samples that reach a given output are correctly classified, then a subsequent tree will not be trained for that output. Otherwise, if some of the training samples have been incorrectly classified for a given output, then a subsequent tree may be trained for that output. The subsequent tree may be trained when the accuracy of the decision tree as a whole does not satisfy a system accuracy threshold (as discussed further above). The subsequent tree may also be trained when the depth of the decision tree as a whole does not satisfy a feature depth threshold (as discussed further above).

In Step 208, a subsequent set of training samples is selected. The subsequent set of training samples may be selected after determining that a subsequent tree is to be trained. The subsequent set of training samples may include a subsequent first portion of the training samples that correspond to the first classification and include a subsequent second portion of the training samples that correspond to the second classification.

A subset of the initial set of training samples lead to the output of the initial tree that corresponds to the subsequent tree. The subset of the initial set of training samples may include training samples from the first portion of the initial set of training samples that correspond to the first classification and training samples from the second portion of the initial set of training samples that correspond to the second classification. The subset of the initial set of training samples is included in the subsequent set of training samples. Additional training samples that correspond to the second classification may be added to the subset of the initial set of training samples to form the subsequent set of training samples. For example, when the first classification is for positive samples (e.g., a face is in the sample) and the second classification is for negative samples (e.g., a face is not in the sample), then additional negative samples are added to the subset of positive and negative samples from the initial set of training samples that reached a particular output.

In Step 210, a subsequent tree is trained that corresponds to an output node. The subsequent tree may be trained in response to determining that the initial tree incorrectly classified the initial set of training samples at an output node of the initial tree. The subsequent tree is trained with the subsequent set of training samples including a subsequent first portion of the training samples that correspond to the first classification and the subsequent second portion of the training samples that correspond to the second classification. The subsequent tree is trained with the subsequent set of training samples by selecting features, extracting feature values, and testing training samples, as described above. The subsequent tree includes a root node connected to an output node of the initial tree.

Additional trees that are connected to output nodes of the initial tree or to output nodes of the subsequent tree may be subsequently trained using the steps described above. By training layers of trees that use different features, computational load is reduced by performing feature extraction for the subset of features for a particular tree instead of performing feature extraction for each of the features of each of the trees. Additionally, a subset of trees are trained instead of training each possible tree for a given number of features, an example of which is further described in FIG. 3A and FIG. 3B.

After training the trees forming a decision tree of a machine learning model, the machine learning model may be used to classify samples that are not part of the training samples. Classifying a sample using the machine learning model generates a sample classification that identifies the classification of the sample. As an example, The sample may be classified to generate a sample classification that identifies that the sample includes an image of a face of a person. Additionally, the sample may be classified by extracting the initial set of feature values for the initial tree of the decision model without extracting the subsequent set of feature values for the subsequent tree of the decision model reducing computational load and execution time.

Figure 3B:
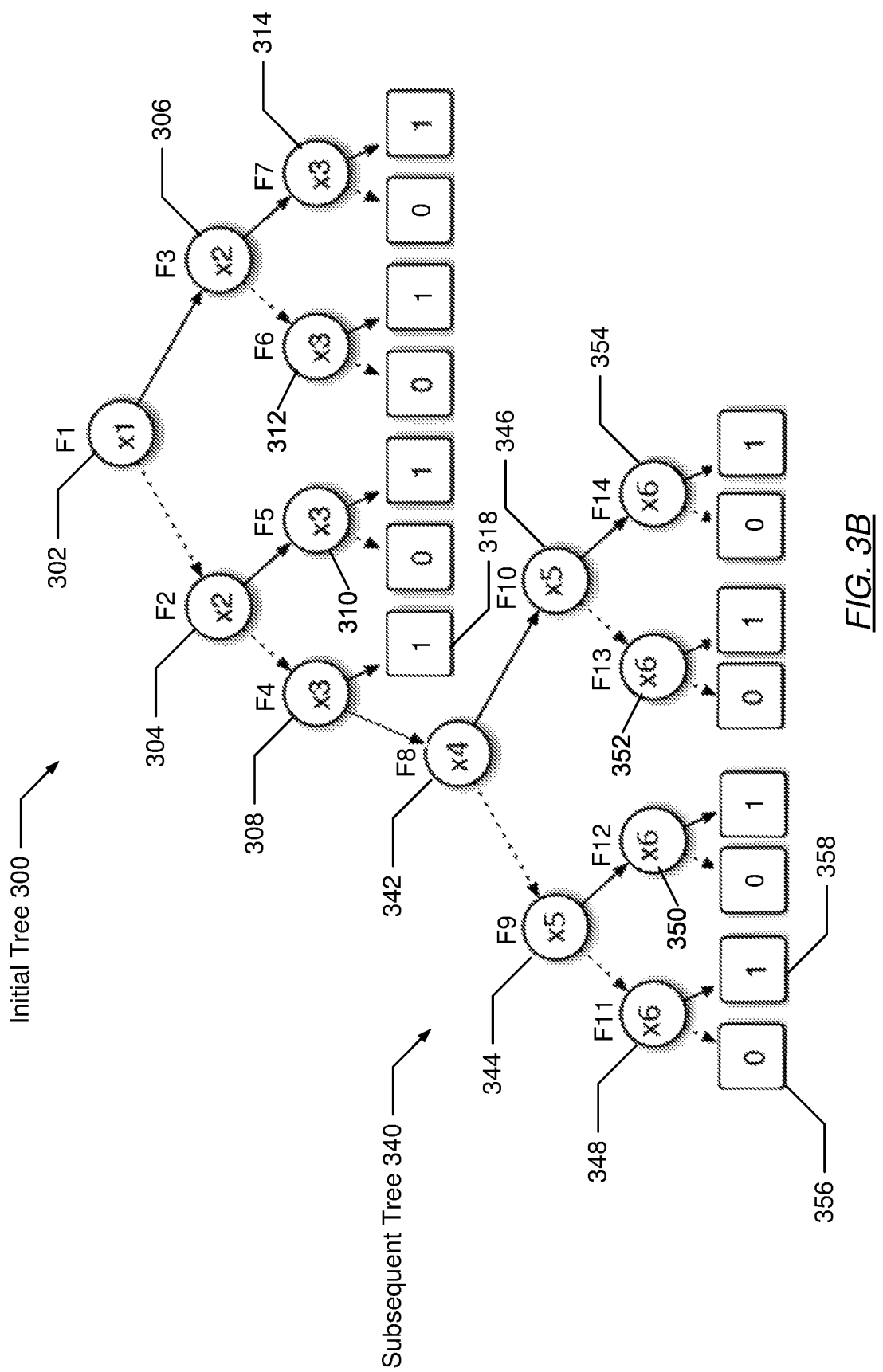
Figure 3C:
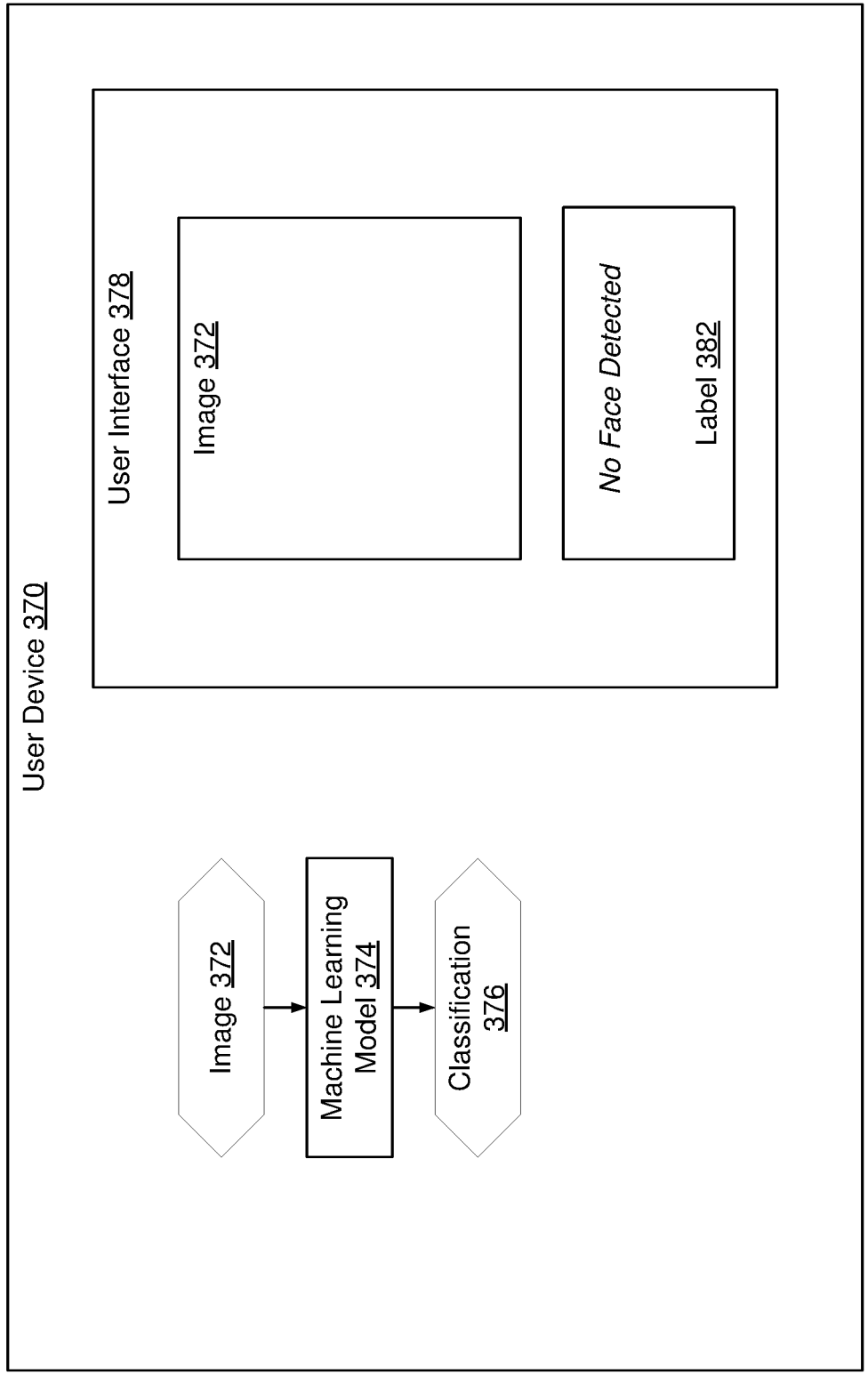

FIG. 3A, FIG. 3B, and FIG. 3C show an example of data structures, systems, and interfaces in accordance with the disclosure. FIG. 3A shows an example of an initial tree. FIG. 3B shows an example of an initial tree modified to include a subsequent tree. FIG. 3C shows an example of a user device using a machine learning model. The embodiments of FIG. 3A, FIG. 3B, and FIG. 3C may be combined and may include or be included within the features and embodiments described in the other figures of the application. The features and elements of FIG. 3A, FIG. 3B, and FIG. 3C are, individually and as a combination, improvements to the technology of computing systems and machine learning systems. The various features, elements, widgets, components, and interfaces shown in FIG. 3A, FIG. 3B, and FIG. 3C may be omitted, repeated, combined, and/or altered as shown. Accordingly, the scope of the present disclosure should not be considered limited to the specific arrangements shown in FIG. 3A, FIG. 3B, and FIG. 3C.

Turning to FIG. 3A, the initial tree (300) is an initial tree of a decision tree of a machine learning model. The initial tree (300) includes the multiple nodes (302, 304, 306, 308, 310, 312, 314). The node (302) is a root node of the initial tree (300) in a first layer of the initial tree (300). A second layer of the initial tree (300) includes the node (304) and (306). The third layer (also referred to as the output layer of the initial tree (300)) includes the nodes (308) through (314). The initial tree (300) is a binary tree and each node includes two branches, which, in this example, indicate a classification of whether a face is or is not detected in a sample. The left branch indicates that a face is not detected and the right branch indicates that a face is detected at a particular node based on the absence or presence of the feature in the sample being tested. Each node tests a sample for a Haar-like feature.

The initial tree (300) tests for seven features in three layers. The first layer ("x1") includes the node (302) that tests for the first feature "F1". The second layer ("x2") includes the nodes (304, 306) that respectively test for the features "F2" and "F3". The third layer ("x3") includes the nodes (308, 310, 312, 314) that respectively test for the features "F4", "F5", "F6", and "F7".

With 3 layers and 2 possible output classifications for each node, the initial tree (300) has a total of 8 possible paths for the two output classifications forming a complete n-layered decision tree with $2^{n-1}$ features. The node (308)

includes the first output (316) and the second output (318). The "0" for the output (316) of the node (308) indicates that the sample corresponds to a first classification (e.g., no face detected) based on the output of the feature "F4" of the node (308), which may be tested after the feature "F2" of the node (304), which may be tested after the feature "F1" of the node (302). The "1" for the output (318) of the node (308) indicates that the sample corresponds to a second classification (e.g., a face is detected in the sample) based on the output of feature "F4" of the node (308). With Haar-like features, the difference between the sum of pixel intensities of adjacent rectangular regions of the sample may be greater than, equal to, or less than zero, which is correlated to the classifications for a sample. For example, when 80% of the samples have a difference greater than zero when a face is present, then the sample is classified under the output (318) (face detected) when the feature "F4" is greater than zero. The feature "F4" is classified under the output (316) (face not detected) when the feature "F4" is less than or equal to zero. The output (316) may not meet the classification accuracy threshold and an additional tree may be trained, as shown in FIG. 3B.

Turning to FIG. 3B, the subsequent tree (340) is added to the initial tree (300) at the left branch of the node (308). The subsequent tree (340) tests for seven additional features in three additional layers. The fourth layer "x4" includes the node (342) testing for the feature "F8". The fifth layer "x5" includes at the nodes (344, 346) and test for the features "F9" and "F10". The sixth layer "x6" includes the node (348) through the node (354), testing for the features "F11" through "F14". After training the subsequent tree (340), the outputs (356, 358) identify the classification of a sample. The accuracy of the outputs may be compared to a classification accuracy threshold for each output of each output node in the sixth layer "x6". For each output in the output layer where the classification accuracy threshold is not met, additional trees and training may be generated and performed to improve the accuracy of the model.

Turning to FIG. 3C, the user device (370) uses the machine learning model (374) to generate the classification (376) of the image (372). The image (372) is displayed in the user interface (378) with the label (382). The user device (370) may be a video conference endpoint.

The machine learning model (374) includes the initial tree (300) of FIG. 3A and the subsequent tree (340) of FIG. 3B. The machine learning model (374) may be trained with a training application on a server of a cloud computing environment and then downloaded to the user device (370).

The classification (376) indicates that the image (372) does not include the face of a person. The label (382) displays the classification (376) in the user interface (378).

Embodiments of the invention may be implemented on a computing system. Any combination of mobile, desktop, server, router, switch, embedded device, or other types of hardware may be used. For example, as shown in FIG. 4A, the computing system (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), and numerous other elements and functionalities.

The computer processor(s) (402) may be an integrated circuit for processing instructions. For example, the computer processor(s) may be one or more cores or micro-cores of a processor. The computing system (400) may also include one or more input devices (410), such as a touchscreen, keyboard, mouse, microphone, touchpad, electronic pen, or any other type of input device.

The communication interface (412) may include an integrated circuit for connecting the computing system (400) to a network (not shown) (e.g., a local area network (LAN), a wide area network (WAN) such as the Internet, mobile network, or any other type of network) and/or to another device, such as another computing device.

Further, the computing system (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (400) in FIG. 4A may be connected to or be a part of a network. For example, as shown in FIG. 4B, the network (420) may include multiple nodes (e.g., node X (422), node Y (424)). Each node may correspond to a computing system, such as the computing system shown in FIG. 4A, or a group of nodes combined may correspond to the computing system shown in FIG. 4A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (400) may be located at a remote location and connected to the other elements over a network.

Although not shown in FIG. 4B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (422), node Y (424)) in the network (420) may be configured to provide services for a client device (426). For example, the nodes may be part of a cloud computing system. The nodes may include functionality to receive requests from the client device (426) and transmit responses to the client device (426). The client device (426) may be a computing system, such as the computing system shown in FIG. 4A. Further, the client device (426) may include and/or perform all or a portion of one or more embodiments of the invention.

The computing system or group of computing systems described in FIGS. 4A and 4B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 4A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The computing system in FIG. 4A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The computing system of FIG. 4A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

The above description of functions presents only a few examples of functions performed by the computing system of FIG. 4A and the nodes and/or client device in FIG. 4B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
   obtaining a plurality of training samples with a plurality of classifications that include a first classification and a second classification;
   training an initial tree with an initial set of training samples selected from the plurality of training samples using an initial set of feature values extracted from the set of training samples, wherein the initial set of training samples correspond to the plurality of classifications; and in response to determining that the initial tree incorrectly classified the initial set of training samples at an output node of the initial tree, selecting a subsequent set of training samples from the plurality of training samples, and training a subsequent tree using a subsequent set of feature values extracted from the subsequent set of training samples, the subsequent tree comprising a root node that replaces the output node of the initial tree that incorrectly classified the initial set of training samples, wherein the subsequent set of training samples correspond to the plurality of classifications, and wherein the subsequent set of training samples is different from the initial set of training samples.

2. The method of claim 1, further comprising:
training the initial tree with a first portion of the plurality training samples corresponding to the first classification and a second portion of the plurality of training samples corresponding to the second classification.

3. The method of claim 2, further comprising:
training the subsequent tree with a subsequent first portion of the plurality of training samples corresponding to the first classification and a subsequent second portion of the plurality of training samples corresponding to the second classification, wherein the subsequent first portion is disjoint from the subsequent second portion.

4. The method of claim 1, further comprising:
classifying a sample to generate a sample classification with a machine learning model, the machine learning model comprising a decision tree that comprises the initial tree and the subsequent tree.

5. The method of claim 4, further comprising:
classifying the sample by extracting the initial set of feature values without extracting the subsequent set of feature values.

6. The method of claim 1, further comprising:
classifying a sample to generate a sample classification to identify that the sample includes an image of a face of a person.

7. The method of claim 1, further comprising
training the initial tree, wherein the initial set of feature values correspond to Haar-like features that categorize subsections of an image.

8. A system comprising:
a processor;
a memory; and
the memory comprising an application, wherein the application executes on the processor, uses the memory, and is configured for:
classifying a sample to generate a sample classification with a machine learning model, the machine learning model comprising a decision tree that comprises an initial tree and a subsequent tree, wherein the machine learning model is trained by:
obtaining a plurality of training samples with a plurality of classifications that include a first classification and a second classification,
training an initial tree with an initial set of training samples selected from the plurality of training samples using an initial set of feature values extracted from the set of training samples, wherein the initial set of training samples correspond to the plurality of classifications, and in response to determining that the initial tree incorrectly classified the initial set of training samples at an output node of the initial tree, selecting a subsequent set of training samples from the plurality of training samples and training a subsequent tree using a subsequent set of feature values extracted from the subsequent set of training samples, wherein the subsequent tree comprises a root node that replaces the output node of the initial tree that incorrectly classified the initial set of training samples, wherein the subsequent set of training samples correspond to the plurality of classifications, and wherein the subsequent set of training samples is different from the initial set of training samples.

9. The system of claim 8, wherein the initial set of training samples includes a first portion of the plurality of training samples corresponding to the first classification and includes a second portion of the plurality of training samples corresponding to the second classification.

10. The system of claim 9, wherein the subsequent set of training samples includes a subsequent first portion of the plurality of training samples corresponding to the first classification and includes a subsequent second portion of the plurality of training samples corresponding to the second classification.

11. The system of claim 8, wherein the first portion is disjoint from the second portion.

12. The system of claim 8, wherein the application is further configured for:
classifying the sample by extracting the initial set of feature values without extracting the subsequent set of feature values.

13. The system of claim 8, wherein the application is further configured for:
classifying a sample to generate a sample classification to identify that the sample includes an image of a face of a person.

14. The system of claim 8, wherein the initial set of feature values correspond to Haar-like features that categorize subsections of an image.

15. A set of one or more non-transitory computer readable mediums comprising computer readable program code for:
obtaining a plurality of training samples with a plurality of classifications that include a first classification and a second classification;
training an initial tree with an initial set of training samples selected from the plurality of training samples using an initial set of feature values extracted from the set of training samples, wherein the initial set of training samples correspond to the plurality of classifications; and
in response to determining that the initial tree incorrectly classified the initial set of training samples at an output node of the initial tree, selecting a subsequent set of training samples from the plurality of training samples and training a subsequent tree using a subsequent set of feature values extracted from the subsequent set of training samples,
wherein the subsequent tree comprises a root node that replaces the output node of the initial tree that incorrectly classified the initial set of training samples, the subsequent set of training samples in the plurality of training samples,
wherein the subsequent set of training samples correspond to the plurality of classifications, and wherein the subsequent set of training samples is different from the initial set of training samples.

16. The set of one or more non-transitory computer readable mediums of claim 15, further comprising computer readable program code for:

training the initial tree with a first portion of the plurality of training samples corresponding to the first classification and a second portion of the plurality of training samples corresponding to the second classification.

17. The set of one or more non-transitory computer readable mediums of claim further comprising computer readable program code for:

training the subsequent tree with a subsequent first portion of the plurality of training samples corresponding to the first classification and a subsequent second portion of the plurality of training samples corresponding to the second classification, wherein the subsequent first portion is disjoint from the subsequent second portion.

18. The set of one or more non-transitory computer readable mediums of claim further comprising computer readable program code for:

classifying a sample to generate a sample classification with a machine learning model, the machine learning model comprising a decision tree that comprises the initial tree and the subsequent tree.

19. The set of one or more non-transitory computer readable mediums of claim 18, further comprising computer readable program code for:

classifying the sample by extracting the initial set of feature values without extracting the subsequent set of feature values.

20. The set of one or more non-transitory computer readable mediums of claim 15, further comprising computer readable program code for:

classifying a sample to generate a sample classification to identify that the sample includes an image of a face of a person.

* * * * *